Patented June 9, 1953

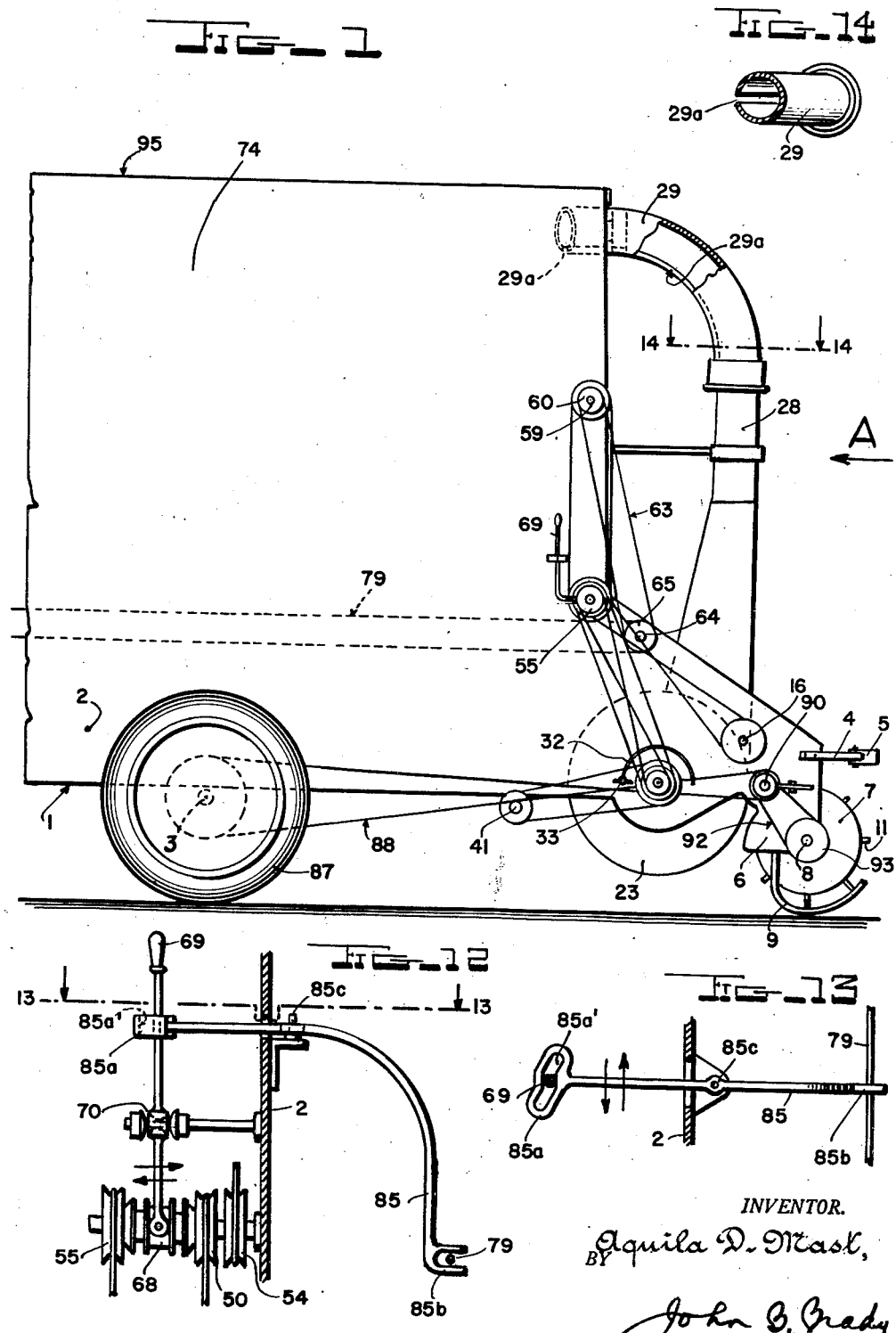

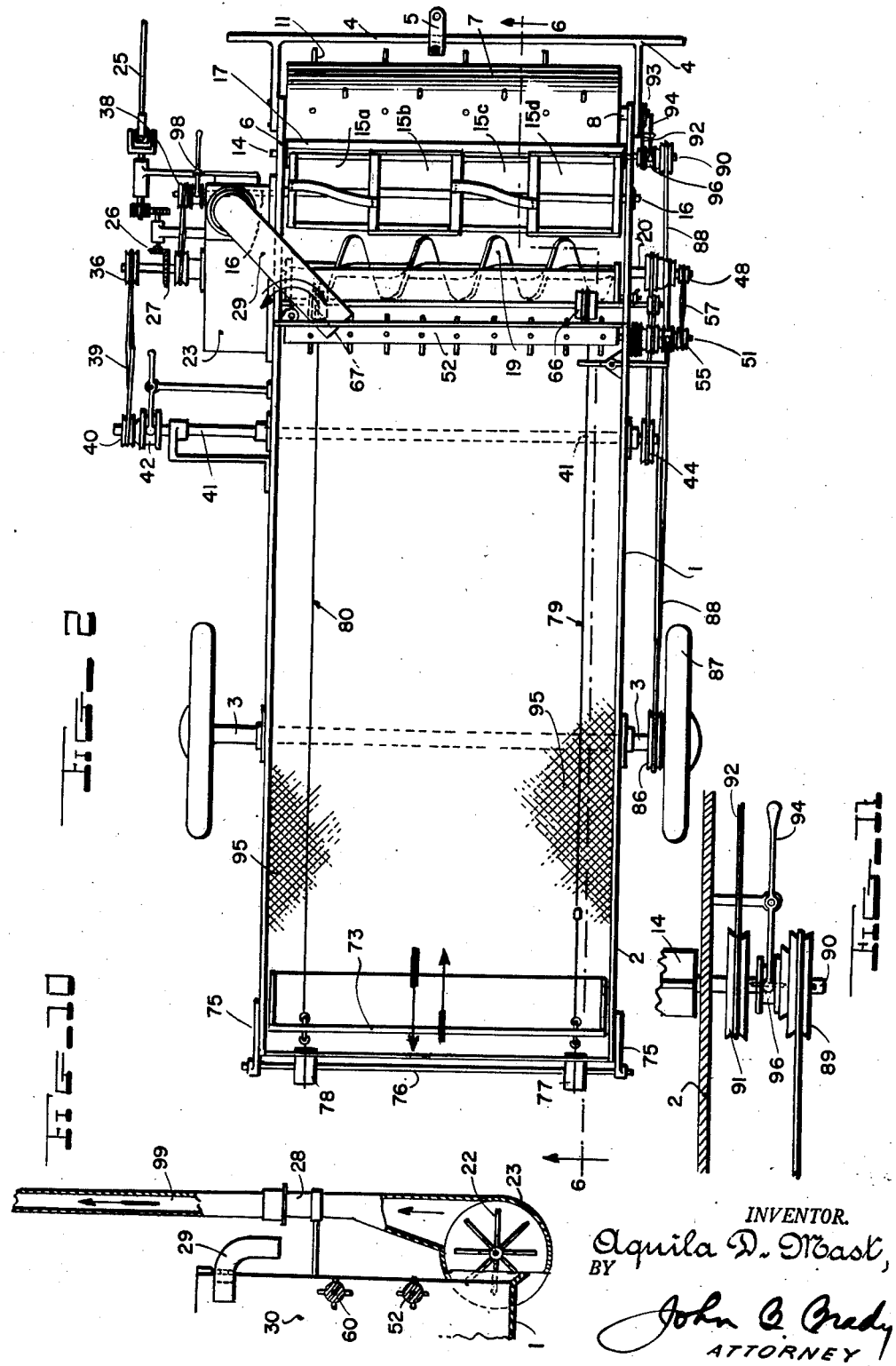

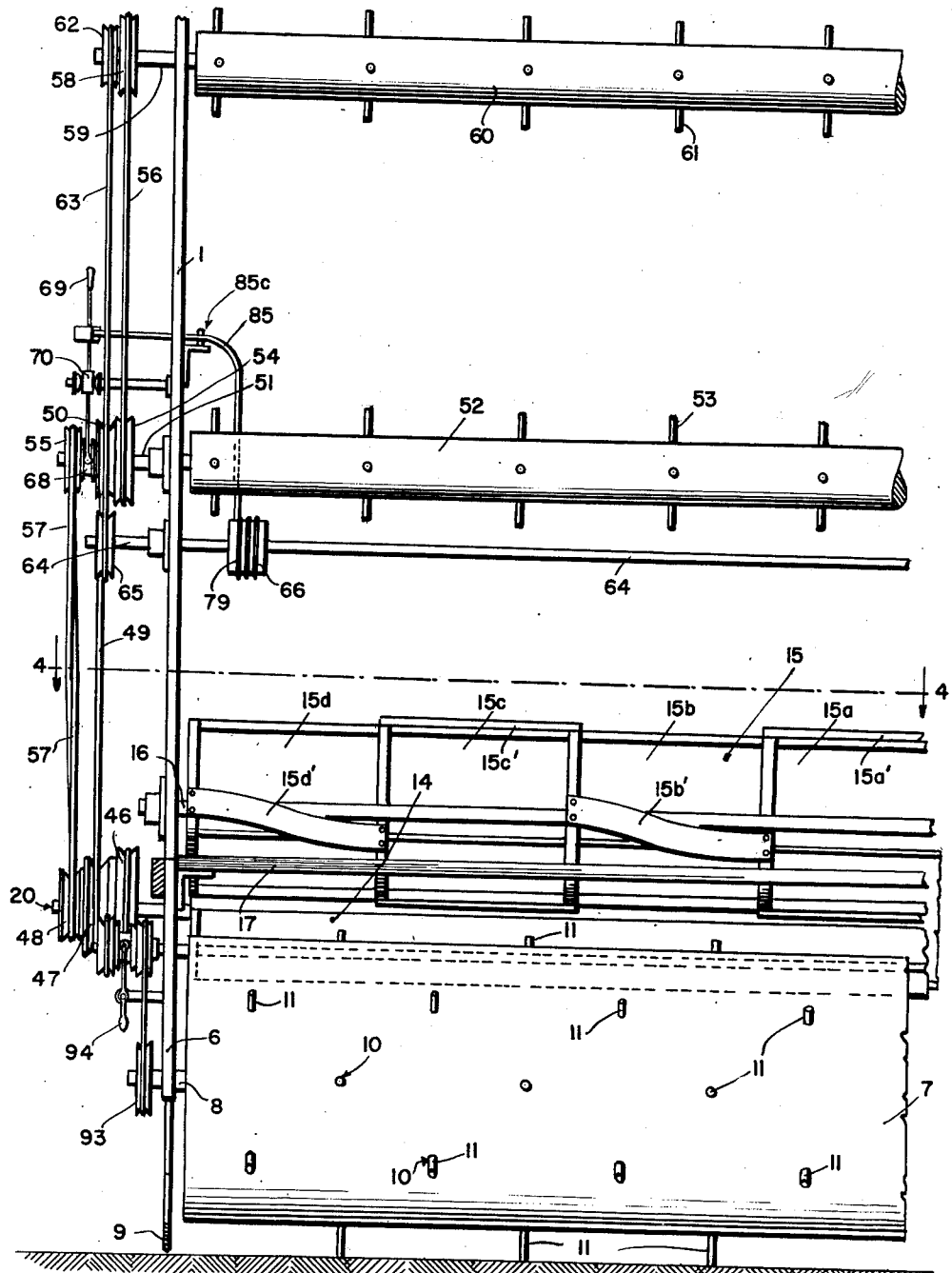

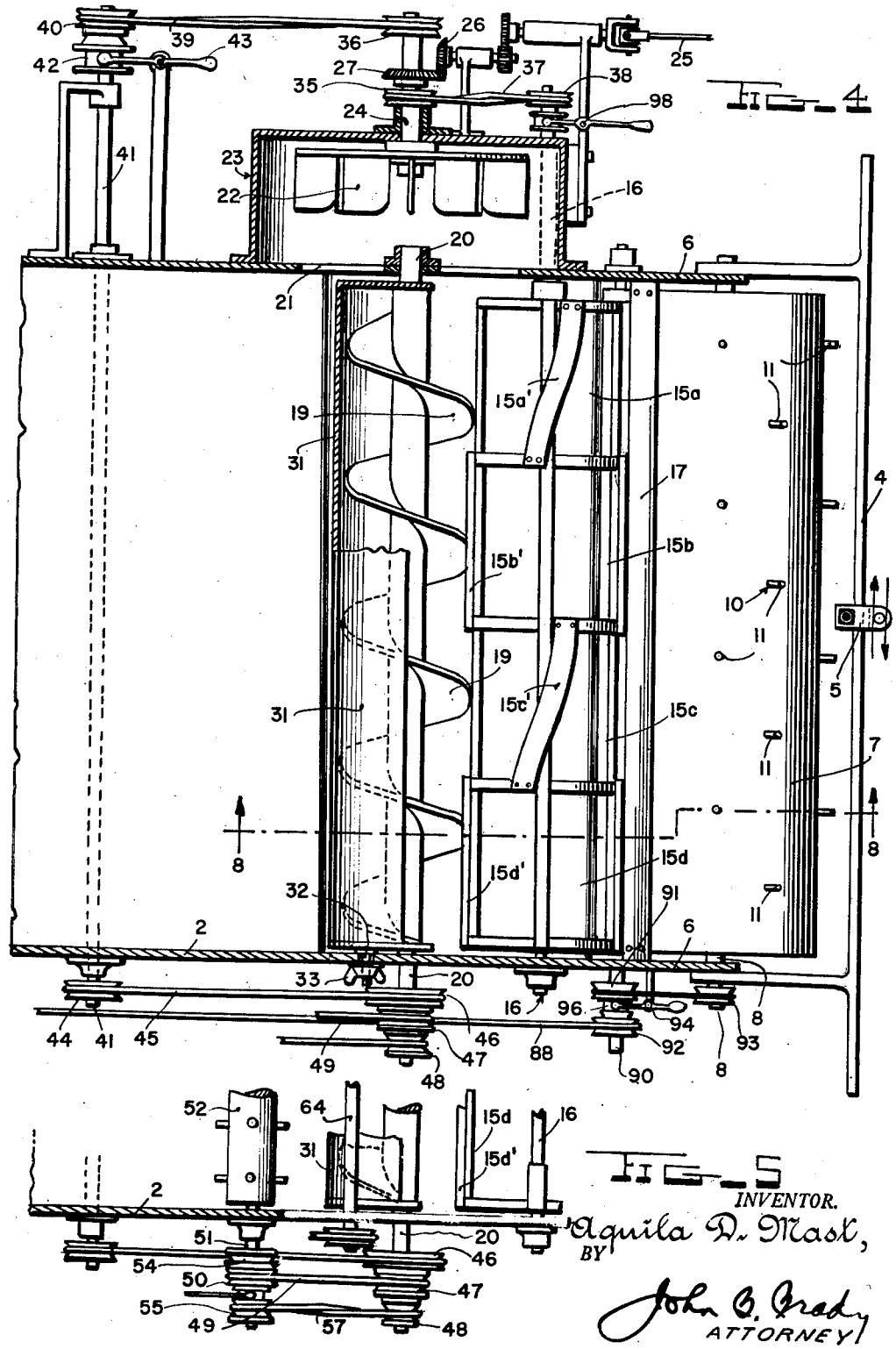

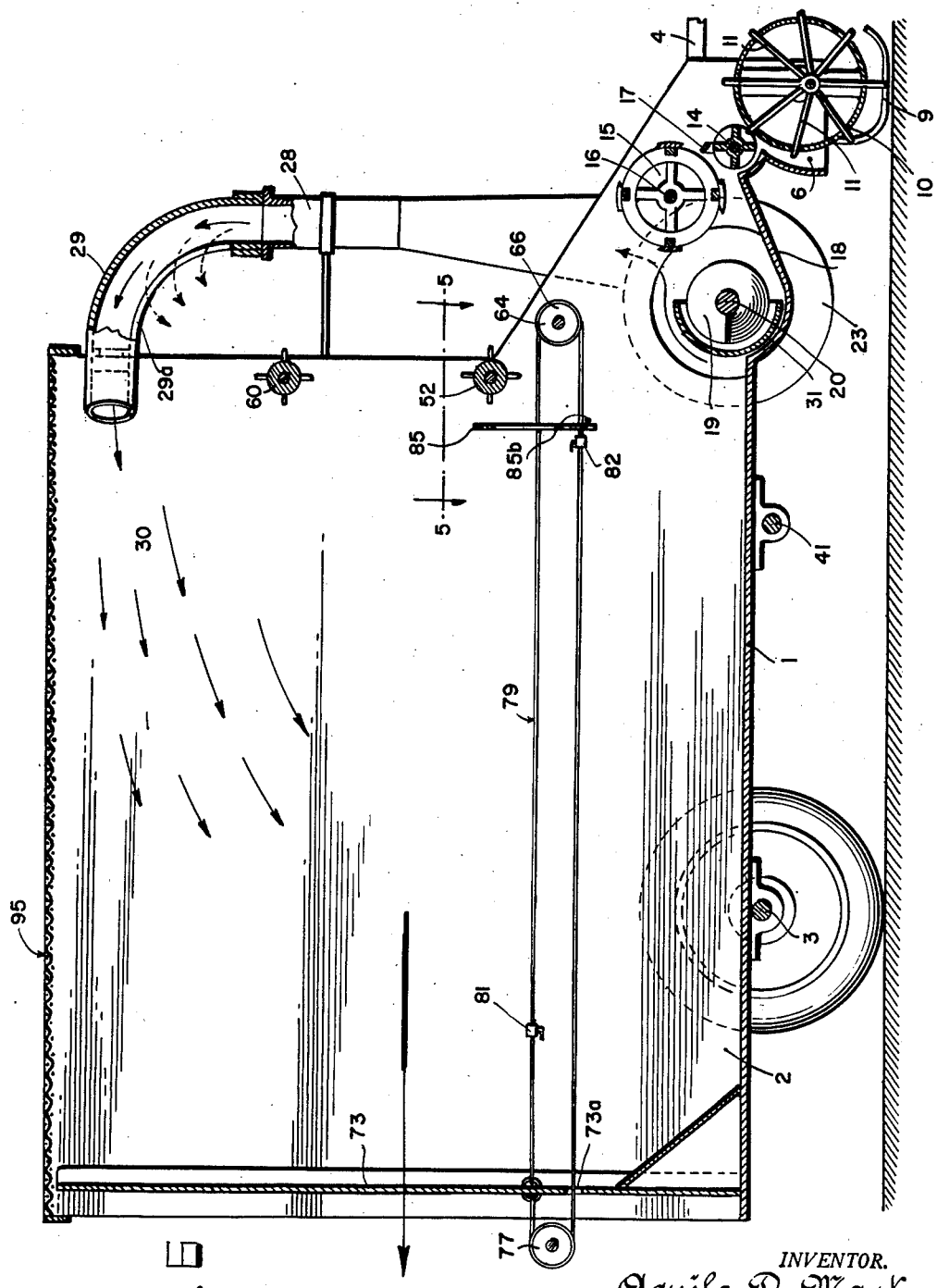

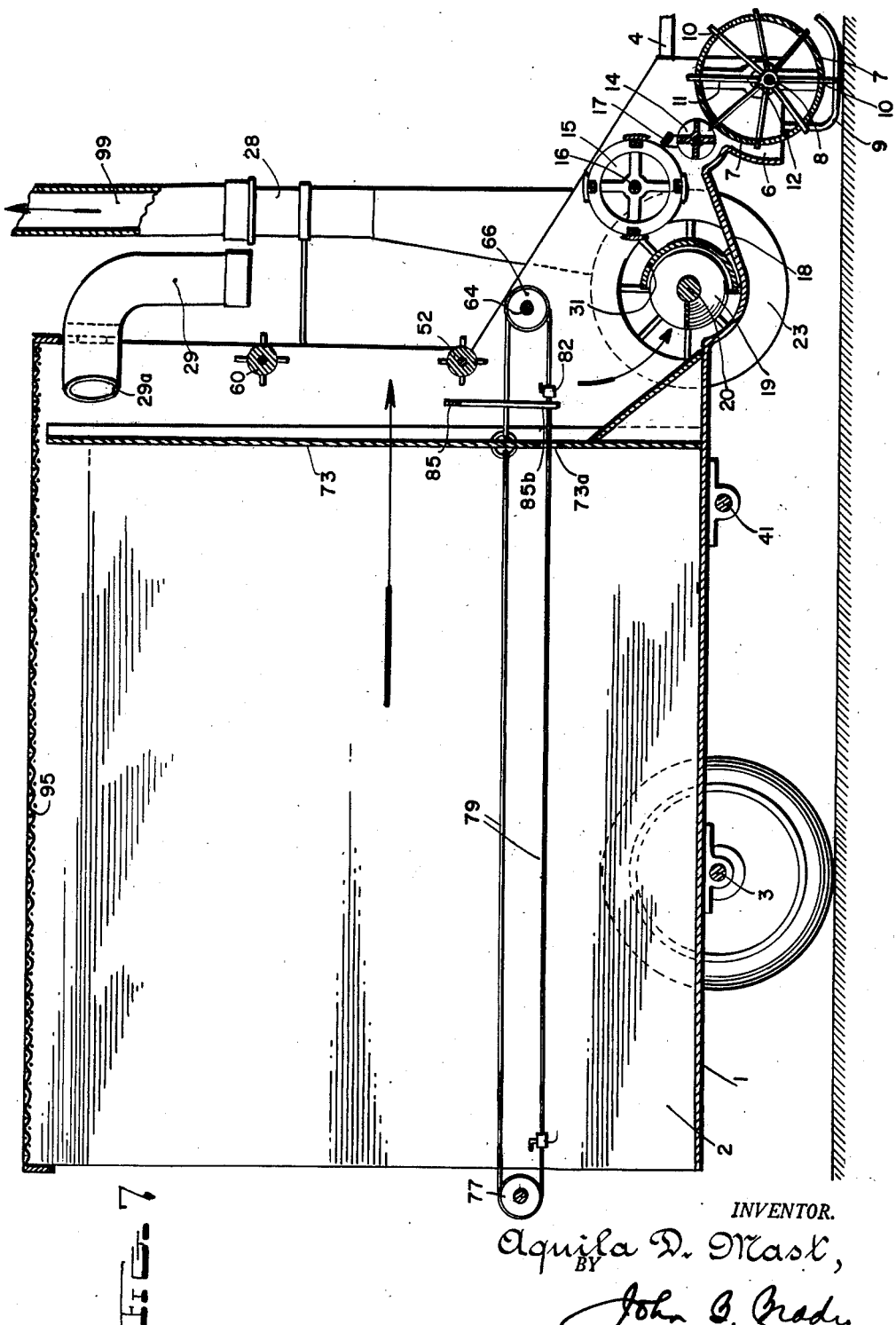

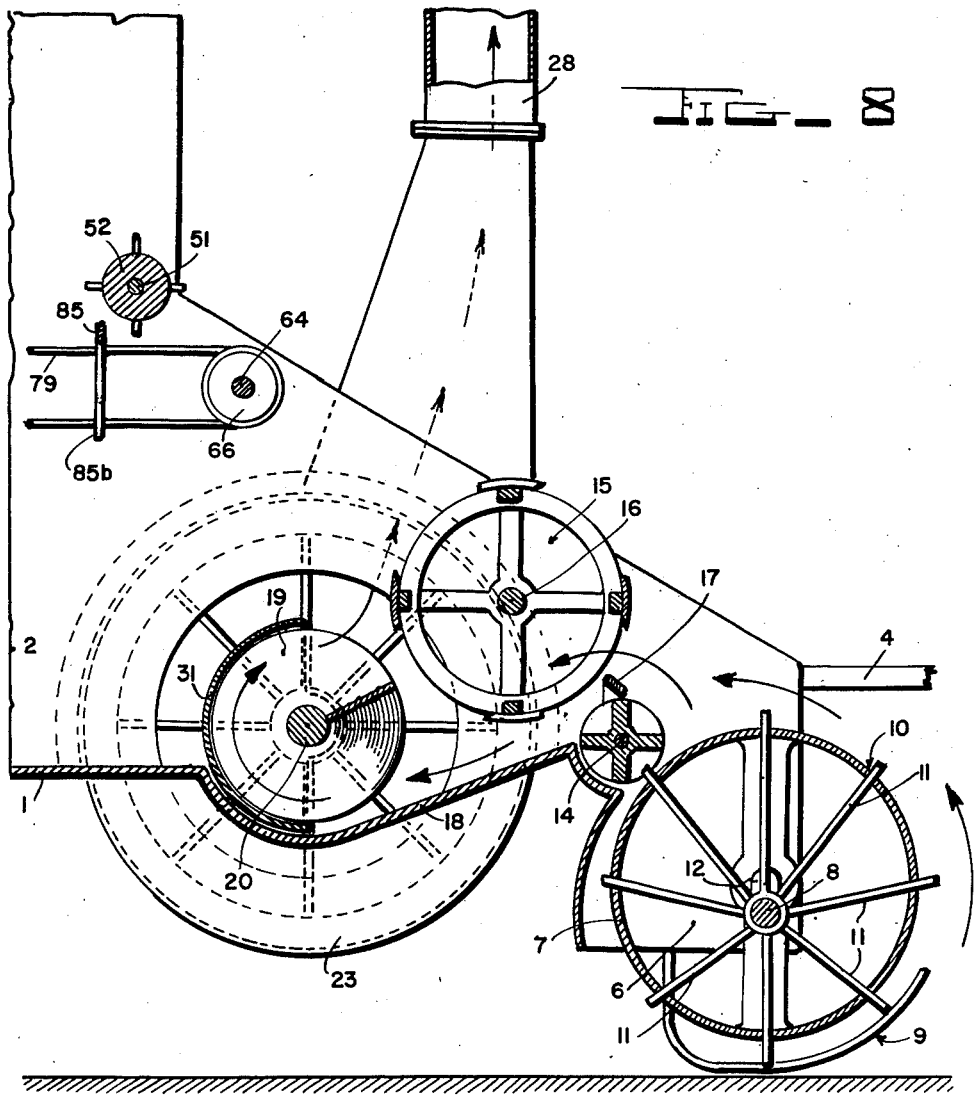
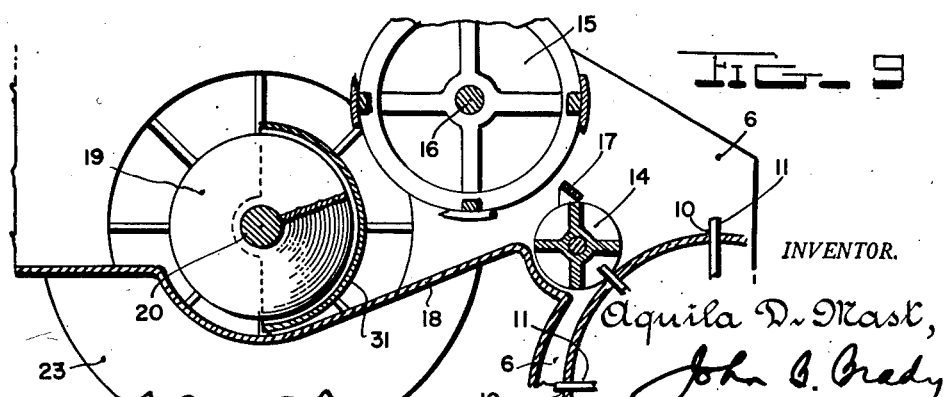

2,641,097

UNITED STATES PATENT OFFICE 2,641,097

HARVESTER EQUIPMENT AND PNEUMATIC METHOD OF LOADING AND UNLOADING SAME

Aquila D. Mast, Lancaster, Pa.

Application September 26, 1949, Serial No. 117,786

7 Claims. (Cl. 56—1)

My invention relates broadly to agricultural and harvesting equipment, and more particularly to an improved loading and unloading method and a construction of forage and ensilage cutter combined with pneumatic loading and discharging means whereby one machine serves a multiplicity of functions generally performed by several machines.

One of the objects of my invention is to provide a combined forage and ensilage gatherer, chopper and pneumatic loader and unloader for performing in one machine a multiplicity of functions for which several machines are generally required.

Another object of my invention is to provide a unique construction of pneumatic loading and unloading mechanism for forage and ensilage harvesters.

Another object of my invention is to provide a unique arrangement of gatherer, chopper and conveyor mechanism for forage and ensilage harvesters, in which the same conveyor mechanism is selectively employed for both loading and unloading operations.

Still another object of my invention is to provide an arrangement of transversely disposed screw conveyor for use in forage and ensilage harvesters, in coaction with a displaceable shield structure by which the same conveyor may be effectively employed in both loading and unloading operations of the harvester.

Still another object of my invention is to provide an arrangement of storage compartment for chopped forage and ensilage or other materials in a harvester, which includes a linearly displaceable partition therein coordinated with means for limiting the path of movement of the partition during the unloading operation of the harvester for advancing stored cut forage or ensilage into the unloading mechanism.

Still another object of my invention is to provide an arrangement of agitating mechanism installed in the storage compartment of a forage or ensilage harvester, for facilitating the feeding of chopped forage or ensilage into a conveyor mechanism during the unloading operation of the harvester.

Still another object of my invention is to provide a construction of blower mechanism for installation upon a forage and ensilage harvester, with means for selectively employing the blower mechanism for either the loading of the harvester or the unloading of the harvester, and the filling of a silo or barn storage, without the use of auxiliary equipment.

Another object of my invention is to provide an improved method of loading and unloading chopped forage, ensilage and the like by use of a portable wheeled storage vehicle equipped with a pneumatic conveyor system selectively operative by cycling and recycling operations to load the portable storage compartment and subsequently unload the portable storage compartment and load the silo using the pneumatic conveyor system of the vehicle.

Other and further objects of my invention reside in the construction and arrangement of parts of the combined loading and unloading mechanism for forage and ensilage harvester, as set forth more fully in the specification hereinafter following by reference to the accompanying drawings, in which:

Figure 1 is a fragmentary side elevational view of the forage and ensilage cutter, chopper and pneumatic loader and unloader of my invention, shown in loading position and with the pneumatic conveyor partially broken away and shown in section; Fig. 2 is a top plan view of the composite forage gatherer, chopper and pneumatic loader and unloader, the pneumatic conveyor being illustrated in loading position; Fig. 3 is a fragmentary end elevational view looking in the direction of arrow A of Fig. 1, and illustrating the arrangement of agitator mechanism in the storage compartment of the machine of my invention; Fig. 4 is a fragmentary transverse sectional view taken substantially on line 4—4 of Fig. 3, with parts shown in section for illustrating the coaction of the components of the mechanism of my invention; Fig. 5 is a fragmentary detail view of the drive mechanism for the screw conveyor and one of the agitator rolls employed in the mechanism of my invention, the view being taken substantially on line 5—5 of Fig. 6; Fig. 6 is a vertical longitudinal sectional view through the harvester equipment of my invention and showing the components in position for the gathering and loading condition, the view being taken substantially on line 6—6 of Fig. 2, but being drawn on an enlarged scale to more clearly show the relationship of the parts; Fig. 7 is a view similar to the view shown in Fig. 6, but illustrating the equipment converted for unloading the forage, ensilage, or other materials into the silo, and with the partition in the storage compartment moved to its extreme limiting position as compared to the limiting position of the partition illustrated in Fig. 6; Fig. 8 is an enlarged longitudinal sectional view taken through a fragmentary portion of the gathering and feeding mechanism, substantially on line 8—8 of Fig. 4, the view showing the position of the reversible shield which coacts with the transverse screw conveyor in the loading position for directing the forage, ensilage or other materials into the blower and pneumatic conveyor; Fig. 9 is a fragmentary cross-sectional view similar to the view shown in Fig. 8, but illustrating the shield reversed in its position and serving as an abutment for directing the stored forage and ensilage or other materials from the compartment on the harvester through the blower and pneumatic conveyor for delivery to the silo; Fig. 10 is a schematic view showing the manner in which the blower on the harvester is used alternately in the loading process as well as in the unloading process as determined by the coupled and uncoupled relation of the pneumatic conveyor leading from the blower with respect to the angularly displaceable elbow leading to the compartment and with respect to the conveyor tube leading to the silo; Fig. 11 is a detail view illustrating the manner of clutching and unclutching the gathering mechanism for deactivating the gathering mechanism when the equipment has been loaded and is being moved to unloading position adjacent the silo; Fig. 12 is a detail end elevational view of the clutching and unclutching mechanism which is controlled by the cable that operates the partition which moves transversely within the compartment within predetermined limits determinative of a loaded condition of the storage compartment and an unloading condition of the storage compartment; Fig. 13 is a horizontal sectional view taken substantially on line 13—13 of Fig. 12, and showing the mechanism for controlling the clutch operating lever in accordance with movement of the cable controlled partition in the storage compartment; and Fig. 14 is a detail sectional view of the elbow which may be connected to and disconnected from the stack leading to the blower whereby the blower may serve as a loading means for the harvester with the elbow connected to the stack, or alternately where the blower may serve as a feeder for delivering forage, ensilage or other materials to the silo when the elbow is disconnected from the blower and the blower connected to the stack leading to the silo.

My invention is directed to hay gatherers, forage and ensilage cutters, stackers, silo fillers and barn storage equipment wherein a single equipment performs a multiplicity of functions, making it unnecessary to provide separate equipment with their accompanying expense, normally required in performing different operations during the harvest. I provide a harvesting equipment in which a pickup, or gathering roll, is positively driven for operation over the field for gathering forage into the machine. I arrange cutters in coaction with the gathering means for chopping the forage into the desired lengths and delivering the cut forage to a screw conveyor extending transversely of the machine. The screw conveyor has associated therewith a movable shield displaceable to either of two limiting positions. In one limiting position of the shield the cut forage is guided by the screw conveyor as it is gathered and chopped into the intake of a blower fan mounted adjacent one side of the machine. The blower fan is positively driven by suitable power means which may be an independent prime mover, or a power take-off from the tractor which draws the machine. The blower fan by its structure serves to create a vacuum that serves to draw the material into the fan and in turn expels the material by the exhaust means of the fan into either the carrying compartment of the machine, or the silo or barn storage. The fan by its structure and operation serves to cut and shred the forage and other materials if desired. With the shield in its limiting position for guiding the forage as it is gathered and chopped into the intake of the fan, the delivery or outlet connection from the exhaust of the fan connects directly into the storage compartment of the machine. As the machine advances along the field the forage is gathered, chopped, and blown into the storage compartment of the machine. Under these conditions the movable partition is displaced to the remote end of the storage compartment in the machine and the cut forage is received and accumulates in the storage compartment between the front thereof and the movable partition.

When the gathering, chopping and blowing operation has continued to the extent that the storage compartment of the machine has been filled, a clutch is actuated to disengage the pickup attachment and also the power take-off connection to the blower, or the prime mover to the blower is disengaged, stopping the screw conveyor, cutter head and blower. The machine is now moved to the silo or the barn storage position.

The silo or barn is provided with a depending pipe which is coupled to the exhaust of the fan blower in place of the conveyor tube which leads to the storage compartment of the machine. With the pipe leading to the silo or barn storage, the machine is now conditioned for blowing out the cut forage from the storage compartment of the machine by angular displacement of the shield associated with the screw conveyor. The shield is reversed in position through approximately 180°, serving to isolate the screw conveyer from the chopper and gathering mechanism, and to expose the screw conveyor to the chopped forage in the storage compartment of the machine. By displacement of the shield with respect to the screw conveyor, all obstruction between the chopped forage in the storage compartment in the machine is eliminated, and operation of the screw conveyer serves to feed the chopped forage, ensilage or other materials from the storage compartment in the machine into the intake of the blower fan for suction delivery through the exhaust of the fan and the pipe leading to the silo or barn storage. The displacement of the shield for conditioning the machine for delivery of the forage from the storage compartment in the machine to the intake of the blower fan also establishes an abutment wall for confining the cut forage and preventing the cut forage from falling into the cutting and gathering mechanism, which is inert during this operation of the cycle of operation of the machine.

To facilitate feeding of the chopped forage from the storage compartment of the machine into the screw conveyer and into the intake of the blower fan for pneumatic feed into the silo or barn storage, I provide means for positively advancing the partition linearly of the storage compartment. This is accomplished by providing a transverse shaft adjacent the screw conveyer end of the machine, carrying drums adjacent opposite ends thereof, over which independent cables operate, the cables extending the entire length of the storage compartment and being looped over sheave members carried by a shaft at the remote end of the storage compartment of the machine. The independent cables are attached at their upper linear portions to the movable partition, but pass freely through the partition adjacent the return path or lower linear portions thereof, so that movement imparted to the drums on the drive shaft adjacent the screw conveyer end of the compartment, serves to linearly advance the partition toward the screw conveyer, thereby forcing the chopped forage into the screw conveyer for delivery into the intake of the blower fan. To facilitate feeding of the forage into the screw conveyor, I provide agitator rollers which are driven in coordination with the screw conveyer to work the forage free from the bulk stack and feed it into the screw conveyer in a continuous uniform flow for delivery to the intake of the fan.

The partition which advances the cut forage in the storage compartment of the machine toward the screw conveyer is controlled in its movement by adjustable stops positioned on the cables. These adjustable stops engage a lever member which coacts with the main clutch driving the cable drum shaft for shifting the clutch to neutral when the partition has advanced to its limit of movement adjacent the screw conveyer, and conversely tripping the clutch to neutral when the partition approaches the remote end of the storage compartment of the machine. The clutch is otherwise manually controlled for the purpose of initiating the partition in motion. Automatic disengagement of the manually controlled clutch is effected by approach of the partition to either of the limits of movement thereof, so that no undue strain is at any time placed upon the partition or cables.

It will be understood that the displacement of the shield is manually controlled in accordance with the cycle of operation of the machine, so that the shield always constitutes a confining abutment for the forage forward of the screw conveyer during the cycle of operation when the operation is advancing toward the conveyer, whereas the shield is displaced to a position isolating the conveyer from the storage compartment when the partition is in its extreme remote rearward position in the storage compartment, and while the storage compartment is being filled pneumatically with the cut forage.

Referring to the drawings in more detail, reference character 1 designates the chassis of the forage and ensilage harvester of my invention, supported on a suitable frame 2, mounted on wheeled axle 3. The forward end of the chassis is provided with an adjustable drawbar 4 for connection of the machine to a tractor through a horizontal adjustable tongue 5, to which the hitch of the tractor connects. The frame 2 provides mounting means 6 for the pickup drum 7 supported on transversely extending shaft 8, journalled in the mounting means 6. The mounting means 6 also carries ground shoes 9 for regulating the height of the pickup drum from the ground. The pickup drum 7 is provided with a multiplicity of apertures 10 therein, through which pickup fingers 11 are attached, to progressively project under control of an appropriate mechanism represented at 12, for governing the progressive receding and projection of the pickup fingers 11 in facilitating the gathering of the forage and ensilage from the field and the delivery thereof into horizontally extending roll 14 journalled at opposite ends in the frame 2. The roll 14 in coaction with the receding pins 11, facilitates the feeding and freeing of the forage and ensilage from the receding pins 11 for delivery to the chopper mechanism represented at 15. The chopper mechanism 15 includes a multiplicity of cutter bar sections which I have represented at 15a, 15b, 15c and 15d, mounted on horizontally extending shaft 16 journalled at opposite ends in the frame of the machine. The sections of the cutter each include alternately displaced cutter blades represented at 15a', 15b', 15c' and 15d', coacting with the stationary cutter bar 17, for chopping the forage and ensilage, fed by roll 14, into short lengths. The short lengths of the forage or ensilage are delivered to chute 18, down which the chopped material gravitates, and is fed into the transversely arranged screw conveyer 19.

The conveyer 19 is carried by shaft 20, which is journalled at opposite ends with respect to frame 2, and is arranged to feed chopped material through the intake opening 21 of the blower fan 22, mounted in blower housing 23. The blower fan 22 is journalled for rotary movement on shaft 24, which is driven from the power take-off shaft 25, or other prime mover, which may be mounted on the machine, operating through bevel gear 26 which meshes with bevel gear 27 carried by shaft 24. Thus, the cut forage or ensilage delivered into the eye of the fan 22 is blown upwardly through the fan housing 23 and stack 28 and through elbow 29 to the storage compartment 30 of the harvester. In order to confine the chopped forage and ensilage in its path of movement to the fan 22, I provide a pivotally mounted shield 31, which is arcuate in contour and is supported on opposite ends on segmental members pivotally mounted on shaft 20. An arcuate slot 32 is provided in the chassis 2 through which a clamping screw and nut, represented at 33, extends from the segmental end of the shield 31, for maintaining the shield 31 in either of its limiting positions to which it gravitates when shifted for conditioning the machine from a pickup and loading operation to a condition for unloading and storing the cut forage and ensilage in a silo or barn storage. A manually controlled lever is provided for shifting the shield 31 to either limiting position, in one position of which the shield serves to guide the cut forage and ensilage into the blower, while in the opposite position the shield 31 serves as an abutment for preventing the cut forage and ensilage from falling into the cutter, or pickup mechanism, as it is moved from the storage compartment of the machine through the blower to the silo or barn storage.

The power for driving the several rotary shafts thus far referred to may be derived from an engine mounted on the machine through suitable clutch mechanism, or the power may be derived from the power take-off shaft 25, which connects with the tractor. As heretofore explained, the fan 22 is driven from power take-off shaft 25 by rotatable driving shaft 24 through bevel gears 26—27. Shaft 24 may also carry sheaves 35 and 36. Sheave 35 may connect through twisted V-belt 37 with sheave 38 carried by shaft 16 which operates the cutters 15. Shaft 24 also drives through sheave 36 the twisted V-belt 39 which engages sheave 40 of countershaft 41 journalled on the frame 2 of the harvester. A clutch 42 operative under control of lever 43 is associated with sheave 40 for controlling shaft 41 which drives sheave 44. Sheave 44 connects through V-belt 45 with sheave 46 carried by screw conveyor 20, which is one of a triple arrangement of sheaves on shaft 20. The associated sheaves of the triple arrangement of sheaves on shaft 20 are designated at 47 and 48. Sheave 47 connects through belt 49 to the center sheave 50 on the shaft 51. Shaft 51 is journalled transversely of the chassis 1 and carries the agitator roll 52, having pins 53 thereon. Shaft 51 also includes sheaves 54 and 55, over which V-belts 56 and 57 operate respectively. V-belt 56, driven from sheave 54, operates over sheave 58 on shaft 59 journalled with respect to chassis 1. Shaft 51 carries agitator roll 60 which is equipped with radially projecting pin 61. Agitator roll 60 is journaled substantially over agitator roll 52 in substantially the same vertical plane. Shaft 59 also carries sheave 62 over which belt 63 operates for driving drum shaft 64 by engagement of sheave 65 thereon. Drum shaft 64 is journalled with respect to chassis 1, and carries thereon the drums 66 and 67 adjacent the opposite interior walls of the chassis 1.

The sheave 55 of the triple sheave arrangement on agitator roll 51 connects through V-belt 57, which is twisted to insure reverse drive movement of sheave 48. A group of sheaves on shaft 51 is arranged with a clutch 68 interposed between sheaves 55 and 50 to permit clockwise or counterclockwise drive. Clutch 68 is controlled by a manually controlled lever 69, which is pivoted with respect to chassis 1 as represented at 70. The manually controlled lever 69 carries a lug 71 thereon, which may be mechanically interengaged in either of three positions with a latching plate 72 supported adjacent thereto. As illustrated, the lever 69 is shown in neutral position, so that no motion is imparted to agitator roll shaft 51. However, upon movement of the center clutch member of clutch 68 to the right, sheave 50 is engaged for driving agitator roll 52 in counterclockwise direction, whereas upon shifting the center clutch member to the left sheave 55 is engaged, thereby operating agitator roll 52 in a clockwise direction. In any one of the positions in which lever 69 is thus set, continuous movement is imparted to the agitator roll 52 in the selected direction, or agitator roll 52 is idle.

Assuming the power take-off shaft 25 to be driven in a counterclockwise direction, it will be clear from an examination of the gearing and belt and sheave connections that the screw conveyor 19 is operated in a clockwise direction and simultaneously fan 22 operates in a counterclockwise direction. The cutters 15 operate in a clockwise direction. Shaft 41, controlled through clutch 42, operates in a clockwise direction. The driving force from sheave 44 is imparted first to the screw conveyor. Rotative power is transmitted from sheave 47 through belt 49 to sheave 50 to shaft 51 of agitator roll 52 in a clockwise direction. Sheave 50 and sheave 55 both run free on shaft 51, being driven from sheaves 47 and 48, respectively, on shaft 20. The twisted V-belt 57 which engages driving sheave 48 and driven sheave 55, insures the operation of sheave 55 in the opposite direction to the direction of movement of sheave 50, so that clutch member 68, when operated by clutch lever 69, may effect driving movement of agitator roll 52 either clockwise or counterclockwise. The fact that sheave 54 is keyed to shaft 51 insures the operation of sheave 58 on shaft 59 through belt 56 in the same direction as shaft 51 is operating so that agitator roll 60 operates in tandem with agitator roll 52. Thus it will be clear that operation of clutch lever 69 serves to selectively control the direction of rotation of both agitator rolls 52 and 60.

The power take-off from agitator shaft 59 through sheave 62 extends through belt 63 to sheave 65 on shaft 64 for operating the drums 66 and 67. By virtue of the selective directional operation obtainable through clutch mechanism 68, the direction of rotation of shaft 64 is readily controlled. The operation of shaft 64 controls the movement of the partition 73 within the storage compartment 74 of the chassis of the harvester. The remote end of the chassis carries a mounting means 75 for a transverse shaft 76 having idler drums 77 and 78 mounted thereon in longitudinal alignment with drums 66 and 67 carried by shaft 64. These sheaves serve as guide and movement control means for the cables 79 and 80 which are looped therearound and which extend through a number of turns around drums 66 and 67, respectively, on shaft 64. The upper portions of each of the cables 79 and 80 are fastened to the partition 73, while the lower portions of these cables pass through apertures 73a and 73b in the partition 73, whereby movement of partition 73 within the compartment 74 is readily controlled.

While the harvester is being loaded and the cut forage and ensilage is being blown through elbow 29 into the storage compartment 74, the partition 73 is located at the remote end of the storage compartment and clutch 68 is maintained in neutral position so that agitator rolls 52 and 60 idle, and drum shaft 64 idles. Elbow 29 is slotted at its innermost side to allow the air to separate readily from the material being blown into the compartment. Moreover, under these conditions shield 31 isolates screw conveyer 19 from the storage compartment 74, as shown in Fig. 6. However, when the storage compartment 74 has been filled, shield 31 is displaced in position by loosening clamping nut 33, enabling the shield 31 to be moved to a position isolating screw conveyer 19 from the pickup and chopping mechanism, but exposing the screw conveyer 19 to the storage compartment 74 for receiving chopped forage and ensilage therefrom while providing an abutment for guiding the chopped forage and ensilage into the blower for delivery to the silo or barn storage. Under these conditions, clutch 68 is shifted to the right for engaging sheave 50 which transmits power from sheave 50 through shaft 51 to agitator roll 52 and through sheave 54 and belt 56 and sheave 58 to shaft 59 for simultaneously activating agitator roll 60 and simultaneously driving belt 63 through sheave 62 for rotating drum shaft 64 through sheave 65 for revolving drums 66 and 67. Cables 79 and 80 are then rolled and unrolled over drums 66 and 67, drawing partition 73 forward of the storage compartment 74 and moving the chopped forage and ensilage into the conveyer 19. In the course of this movement, agitator rolls 52 and 60 continuously direct the bulk of chopped forage and ensilage into the conveyer 19 in a uniform path.

The movement of the partition 73 having been initiated by the mechanical clutch operation of clutch member 68, continues until an automatic disengagement of the clutch is effected by engagement of adjustable stops 81 and 82, which are adjustably positioned on cable 79. A lever member 85 is pivotally mounted at 85c with respect to the chassis 1 and carries a slotted plate member 85a at one end, slotted at 85a', and a bifurcated member 85b at the other end for the passage of lower section of the cable 79. Slot 85a' is diagonally disposed and serves as an actuating cam for moving hand lever 69. As the partition 73 approaches the discharge end of the storage compartment 74, adjustable stop 81 abuts against bifurcated member 85b and tilts lever 85. Lever 85 is connected about pivot 85c to the hand lever 69 and rocks about fulcrum 70 as slot 85a' engages and moves hand lever 85 thereby shifting clutch member 68 from sheave 50, thus interrupting the automatic travel of the partition member 73.

When the machine is to be reloaded lever 69, as shown more clearly in Fig. 12, is shifted to the right, or clutch member 68 is shifted to the left, engaging clutch member 68 with sheave 55, thereby positively driving drum shaft 64 for moving the partition 73 rearwardly of the compartment. Adjustable stop 82 contacts slotted portion 85b of the end of lever 85 pivoted with respect to frame 2 at 85c as partition 73 approaches the limit of its travel toward the end of the storage compartment, thereby shifting the slotted end 85a of lever 85 with respect to lever 69, disengaging clutch 68 from sheave 55, and retaining the clutch in neutral position, whereby partition 73 is brought to a condition of rest preparatory to a repeat cycle operation under control of the manual engagement of the clutch 68 and the automatic disengagement thereof. The slotted end 85a of lever 85 is so shaped that the direction of movement of lever 69 is controlled to determine the direction in which clutch member 68 is shifted from engaging either sheave 55 or 50 for controlling the direction of movement of cable 78.

The pickup mechanism in the harvester of my invention is controlled in accordance with the movement of the harvester over the field. Sheave 86 is fastened to the interior side of the wheel represented at 87, and drives belt 88 which is twisted and engages sheave 89 carried by shaft 90 on which feed roll 14 is mounted. Shaft 90 also carries a sheave 91 connected through belt 92 to sheave 93 on the end of shaft 8 which carries the pickup drum 7. Thus, the feed roll 14 and pickup drum 7 are positively driven from the tractive movement of the harvester over the field, the drive being effected for both pickup drum 7 and feed roll 14 in a counterclockwise direction, which is a direction opposite to the direction of rotation of the wheels represented by wheel 87 by reason of the twisted arrangement of the belt 88. Sheave 89 is free of shaft 90 while sheave 91 is keyed to shaft 90. A shiftable clutch member 96, which is keyed to shaft 90, coacts with sheave 89 under control of manually operative lever 94 for connecting rotatively driven sheave 89 with clutch member 96 for rotatively driving shaft 90 of feed roll 14 and sheave 91 belted to the operative means for pickup drum 7. Thus, the pickup and feed mechanism may be disengaged when the harvester is being moved from the field to the unloading position at the silo or barn storage for connection to the silo feed tube 99.

In order to retain the cut forage and ensilage within the storage compartment, I may cover the top of the storage compartment 74 with a mesh wire, or other suitable means, as represented generally at 95. The circulation of air under control of the blower will therefore not tend to blow the cut forage and ensilage from the stored position within the storage compartment.

In order to render the rotatable cutter 15 readily controllable I interpose a clutch 98 between the driving sheave 38 and the rotary shaft 16 of the rotary cutter 15, as shown more clearly in Figs. 2 and 4. Depending upon condition and custom in various regions the rotary cutter head 15, and cutter bar 17 can be removed and material fed directly from the pickup drum 7, into the conveyer 19, and the blower fan 22 will shred the material sufficiently fine, as the cycle requires the material to go through the blower fan twice.

The principles of operation of my harvester have been detailed with respect to cut forage and ensilage, and other materials. It will be understood, however, that the basic principle of my machine is that of providing a single unit for performing a multiplicity of functions, that is, a gathering, chopping and temporary storage function, and subsequently an unloading function, without any necessity for handling the material manually, and without the use of auxiliary equipment. Accordingly, it will be understood that in lieu of the applications of the principles of my machine to forage and ensilage gathering, chopping, loading and unloading, I may employ the same principles in a machine for transporting and unloading forage, ensilage and grain from the field. In this application of my invention the pickup, feeding and cutting mechanism may be eliminated, and the storage compartment of the machine arranged to directly receive forage, ensilage and grain, or similar materials, directly from a combine or harvesting machine in the field. The machine of my invention, including the screw conveyor and blower, after being loaded with the grain or similar material or the aforesaid forage and ensilage, may then be moved to the silo or barn storage position and unloaded by operation of the screw conveyor and blower and movable partition as hereinbefore explained.

The fact that the forage or ensilage is subjected to the shredding action of the fan 22 twice in each cycling and recycling operation, that is first during the storage in the compartment carried by the vehicle, and second during the transfer of the forage or ensilage from the vehicle into the silo under control of the same fan carried by the vehicle, insures dividing of the forage or ensilage into particles of sufficiently small size to allow pneumatic conveyance of the material into the silo.

While I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A harvester for forage, ensilage and the like comprising a wheeled chassis, motive means for driving said chassis, a frame supported by said wheeled chassis, a transversely extending screw conveyer carried by one end of said frame and driven by said motive means, a gatherer and chopping mechanism for gathering and delivering chopped forage, ensilage and the like to said screw conveyor, a blower located at one side of said frame in coaxial alignment with said screw conveyer and driven from said motive means for entraining chopped forage, ensilage and the like in a forced stream of air, a pneumatic delivery tube extending from said blower, a screened storage compartment carried by said frame for retaining chopped forage, ensilage and the like while permitting the escape of the air in which the chopped forage, ensilage and the like is entrained, an angularly displaceable elbow mounted adjacent the top of said storage compartment, said pneumatic delivery tube being adaptable for connection to either said angularly displaceable elbow or to a silo storage tube connection whereby said blower is operative to selectively blow chopped forage, ensilage and the like to said storage compartment or to said silo storage tube connection, a movable partition member extending transversely of said storage compartment and driven means operative in timed relation to the movement of said screw conveyer and driven by said motive means for advancing said partition toward said screw conveyor for delivering chopped forage, ensilage and the like from said storage compartment to said screw conveyer for delivery thereby to said blower.

2. A harvester as set forth in claim 1 in which agitation means are disposed in said storage compartment and means operating in timed relation to the operation of said screw conveyer and driven by said motive means for operating said agitation means for facilitating feeding of chopped forage, ensilage and the like from said storage compartment into said screw conveyer for delivery to said blower.

3. A harvester as set forth in claim 1 and means including a clutch device for arresting the movement of said partition when said partition reaches a predetermined position adjacent said screw conveyor.

4. A harvester as set forth in claim 1 in which said storage compartment also includes clutching and declutching mechanism for initiating said partition into linear progressive movement and arresting the movement of said movable partition when said movable partition has advanced to a predetermined limiting position adjacent the remote end of said storage compartment.

5. A harvester as set forth in claim 1, cable and drum mechanism mounted in said frame and connected with said movable partition for imparting linear movement to said partition in timed relation to the operation of said screw conveyer, means for manually initiating said cable and drum mechanism into operation for effecting linear movement of said partition, and separate means for interrupting the operation of said cable and drum mechanism for arresting the linear movement of said partition as said partition approaches the screw conveyer for delivering the stored chopped forage, ensilage and the like thereto, or as said partition approaches the remote end of said frame.

6. A harvester as set forth in claim 1 including means for manually initiating the movement of said movable partition, and means for automatically arresting the movement of said movable partition as said movable partition reaches either of the limiting positions thereof.

7. A harvester as set forth in claim 1 including cable and drum mechanism connected with said movable partition for advancing said movable partition linearly through said storage compartment for pressing chopped forage, ensilage and the like into said screw conveyer, drive means for said cable and drum mechanism driven from said motive means, one of the cables of the cable and drum mechanism having a dog secured thereon, a lever mechanism terminating in a yoke embracing the said cable in the path of the dog thereon, a clutch controlled by said lever mechanism, and means controlled by said clutch for arresting the movement of said cable and drum mechanism upon abutment of said dog with said lever mechanism for automatically disconnecting the drive means to said cable and drum mechanism when said partition approaches the limits of the path of travel thereof.

AQUILA D. MAST.

References Cited in the file of this patent

UNITED STATES PATENTS

| Number | Name | Date |
|---|---|---|
| 1,771,025 | Barry | July 22, 1930 |
| 1,883,402 | Ronning et al. | Oct. 18, 1932 |
| 2,038,008 | Shodron | Apr. 21, 1936 |
| 2,099,032 | Penn | Nov. 16, 1937 |
| 2,324,042 | Swenson | July 13, 1943 |
| 2,353,029 | Graham | July 4, 1944 |
| 2,421,418 | Grossman | June 3, 1947 |
| 2,439,259 | McCormack | Apr. 6, 1948 |
| 2,480,527 | Wachter | Aug. 30, 1949 |
| 2,528,679 | Ballard et al. | Nov. 7, 1950 |